July 16, 1968     T. L. BROWN     3,392,572

STEAM QUALITY MEASURING APPARATUS AND METHOD

Filed March 26, 1965     2 Sheets-Sheet 1

INVENTOR
THOMAS L. BROWN

BY Burns, Doane, Benedict, Sweeker & Mathis

ATTORNEYS

July 16, 1968 T. L. BROWN 3,392,572
STEAM QUALITY MEASURING APPARATUS AND METHOD
Filed March 26, 1965 2 Sheets-Sheet 2

INVENTOR
THOMAS L. BROWN

BY Burns, Doane, Benedict,
Swecker & Mathis
ATTORNEYS

United States Patent Office 3,392,572
Patented July 16, 1968

3,392,572
STEAM QUALITY MEASURING APPARATUS
AND METHOD
Thomas L. Brown, Duncan, Okla., assignor to Halliburton
Company, Duncan, Okla., a corporation of Delaware
Filed Mar. 26, 1965, Ser. No. 442,999
10 Claims. (Cl. 73—29)

ABSTRACT OF THE DISCLOSURE

Method and apparatus for measuring the quality of steam as it flows in a system. The steam is separated into its vapor and liquid components in a steam separator. The liquid component flows out of the bottom of the separator and the rate of liquid flow is measured. The vapor flowing out of the separator is conducted through a nozzle which acts as an injector for drawing liquid into a conduit from the liquid outlet of the separator. A flow meter in the liquid outlet measures the rate of flow of the separated liquid. The quality or moisture content of the steam may be computed from the feedwater rate to the steam generating unit and the liquid flow rate as measured by the flow meter.

---

This invention relates to measuring methods and apparatus, and more particularly to a method and apparatus for measuring the quality of steam.

If is often necessary to measure the quality or moisture content of steam as it flows through a system. One conventional method of measuring steam quality is by means of a steam calorimeter. One common type of calorimeter utilizes a portion of steam which is withdrawn from a header through a sampling tube. Between the sampling tube and the calorimeter, the steam passes through a valve or orifice where it is throttled to a lower pressure. The temperature and pressure of the steam in the calorimeter is then measured and the quality of the steam may be determined from conventional steam charts. The throttling calorimeter may be used only if the steam in the calorimeter is superheated. Furthermore, a throttling calorimeter is unsuitable for measuring the quality of extremely wet steam.

Another type of calorimeter that may be used is a separating calorimeter. This device separates the liquid from the vapor and measures each separately. A separating calorimeter is awkward to operate and the results are usually not reliable because a portion of the vapor escapes and is not measured. Both types of calorimeters have the disadvantage of removing a portion of the steam from the system, so that it is not available for performing useful work. This loss of steam is significant when size and weight limitations require the steam generating unit to operate at full capacity.

Accordingly, it is an object of this invention to provide an improved method and apparatus for measuring steam quality.

It is a further object of this invention to provide a method and apparatus for continuously measuring the quality of wet steam.

It is a still further object of this invention to provide a method and apparatus for efficiently measuring the quality of wet steam without removing water and vapor from the system.

These objects are accomplished in accordance with a preferred embodiment of the invention by separating the liquid from the vapor in steam. The liquid is collected in the bottom of a separator and by means of a valve, the flow of liquid out of the bottom of the separator is adjusted until is corresponds to the rate of flow of liquid into the separator from the steam inlet. A flow meter measures the rate of flow of liquid from the separator. The vapor outlet conduit from the separator is connected with the liquid outlet downstream from the flow meter. A nozzle in the vapor outlet conduit draws the liquid from the bottom of the separator through the rate meter and into the vapor outlet conduit where it is entrained in the vapor to form wet steam and flows to the point of use. The separator is provided with means for measuring the level of liquid collected in the separator, and a valve in the liquid outlet line may be adjusted to maintain the liquid level substantially constant. The quality or moisture content of the steam may be computed from the feedwater rate to the steam generating unit and the liquid flow rate as measured by the flow meter.

This preferred embodiment is illustrated in the accompanying drawings, in which.

Figure 1:
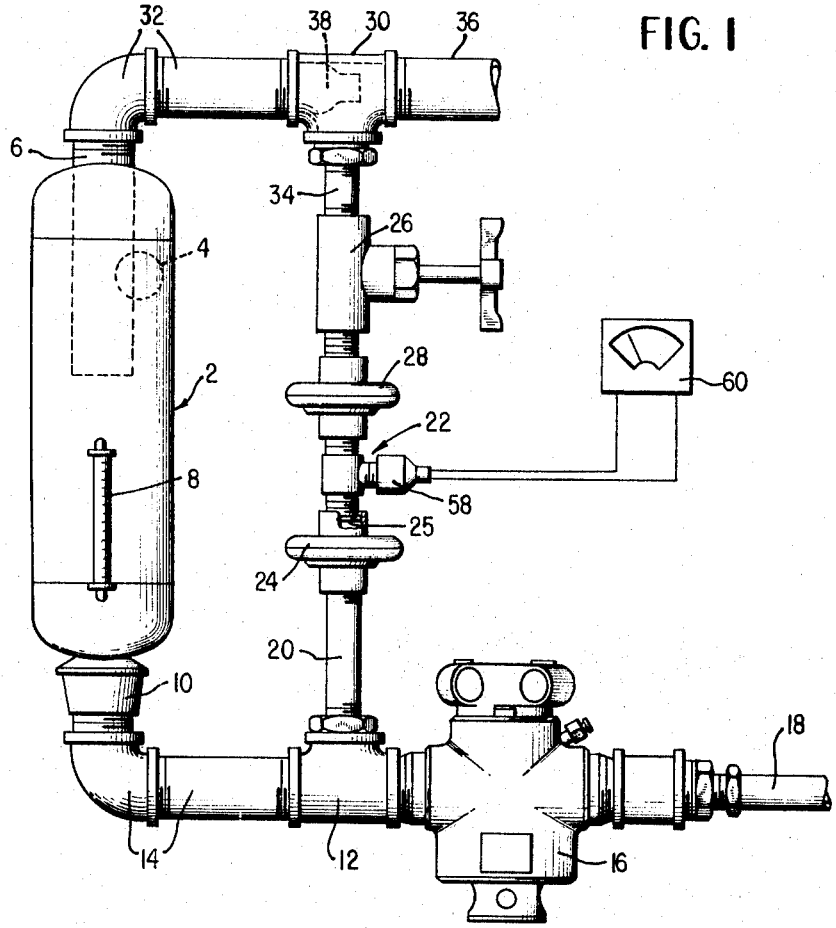
FIG. 1 is a side elevational view partially schematic, of the steam quality measuring apparatus of this invention.
Figure 2:
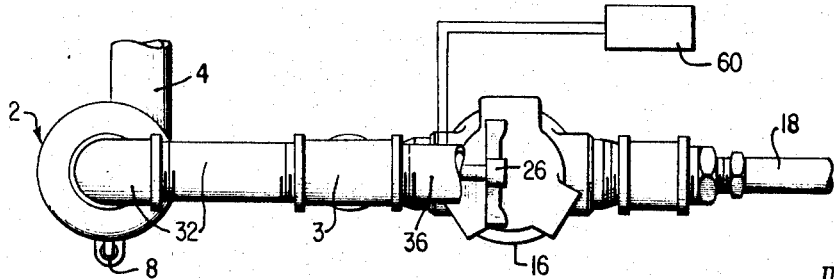
FIG. 2 is a top plan view of the steam quality measuring apparatus.

Referring to FIGS. 1 and 2, the steam quality measuring apparatus includes a steam separator 2 having a steam inlet pipe 4 for receiving steam from a generating unit. The inlet pipe 4 is offset from the center of the separator to cause the steam to swirl in a helical path inside the separator. A vapor outlet pipe 6 extends upright through the top of the separator 2. The lower end of the vapor outlet pipe 6 is spaced below the steam inlet pipe 4 to cause the steam to flow through a circuitous path before entering the outlet pipe 6. The velocity of the steam flowing through the separator normally is sufficient to separate the liquid from the vapor by centrifugal force. Liquid droplets collect on the inside wall of the separator 2 and flow down the wall to the bottom of the separator where they are collected. The level of the liquid in the separator 2 is measured by a conventional sight glass 8.

A liquid outlet pipe 10 extends through the bottom of the separator 2 for draining liquid from the separator. The liquid outlet pipe 10 is connected with a conventional T-joint 12 by pipe sections 14. A valve 16 is connected to the opposite side of the T-joint 12 and the outlet of the valve is connected with a suitable drain pipe 18. A short section of pipe 20 connects the T-joint 12 with a flow meter 22. The adjacent ends of the pipe 20 and the meter 22 are joined together by a conventional threaded union 24. In order to trap rust, scale and other foreign particles, a filter screen 25 is mounted in the threaded connection between the meter 22 and the union 24. A valve 26 is connected to the opposite end of the flow meter 22 by a conventional union 28.

The vapor outlet pipe 6 is connected with a T joint 30 by conventional pipe sections 32. The valve 26 also is connected with the T joint 30 by a short pipe 34. A conduit or header 36 for conducting the steam to its ultimate point of use is threadedly secured to the outlet side of the T joint 30. The T joint 30 has a jet nozzle 38 which utilizes the vapor flowing in the pipe section 32 to draw liquid from the pipe 34.

Figure 3:
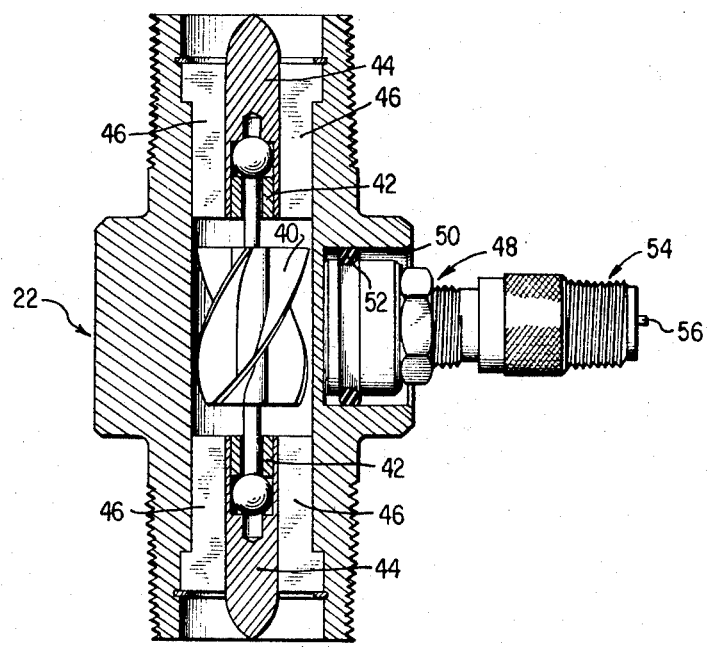
FIG. 3 is an enlarged cross sectional view of the water flow meter.

The flow meter 22 preferably is a turbine type flow meter, as shown in FIG. 3. The flow meter 22 includes a turbine rotor 40 mounted for rotation in bearings 42. The bearings 42 are supported in bearing housings 44, and a plurality of radial vanes 46 extend between each housing 44 and the body of the meter 22. A pickup 48 is secured in a socket 50 in the body of the meter 22 by an elastic O-ring 52 which is wedged between the pickup 48 and the wall of the socket 50. The friction between the O-ring 52 and the wall of the socket 50 is sufficiently great to prevent accidental displacement of the pickup 48 out of the socket.

The pickup 48 has a permanent magnet mounted therein with an electrical coil surrounding the magnet. The magnetic field around the permanent magnet extends through the body of the meter 22 and into the space occupied by the turbine rotor 40. One end of the electrical coil is connected to the threaded connection 54 and the opposite end of the electrical coil is connected to a center pin 56, and these electrical connections are insulated from each other. A cap 58, as shown in FIG. 1, engages the threaded connection 54. A contact in the cap 58 engages the pin 56 to complete an electrical circuit through a current measuring instrument 60. As the turbine rotor 40 rotates, the blades of the turbine cut the magnetic field and generate electrical pulses in the coil. The frequency of these pulses is a function of the speed of rotation of the rotor 40 and the instrument 60 is calibrated to indicate the liquid flow rate through the meter 22 as a function of the frequency of the pulses.

In operation, steam from a steam generating unit is supplied to the separator 2 through the steam inlet pipe 4. The steam swirls around inside the separator 2 and droplets of liquid impinge on the interior walls of the separator and are collected in the bottom of the separator. Vapor flows vertically upward through the outlet pipe 6. The valve 16 is open initially, as is the valve 26. When the header 36 is connected in a system for utilization of the steam, the pressure in the pipe 36 would be above atmospheric pressure, while the pressure in the drain pipe 18 is approximately atmospheric pressure. This pressure differential causes steam to flow from the T joint 30 through the valve 26 and the meter 22, and out through the drain pipe 18. This direction of flow through the filter 25 removes scale and rust which may have accumulated on the filter 25 while the system is in operation or while the system is closed down. When the valve 16 is open, steam flows out of the collector 2 through the outlet 10 to the drain pipe 18. After the system has been flushed in this manner, the valve 16 is closed and the liquid level in the collector 2 begins to rise. The valve 26 is partially closed until the level of liquid as indicated in the sight glass 8 remains substantially constant. When it is adjusted in this manner, the flow of liquid through the meter 22 is equal to the rate of accumulation of liquid in the separator 2.

The jet nozzle 38 acts as an injector to draw the liquid from the pipe 34 and to cause intimate mixing of the liquid with the vapor and thereby return the steam to the same wet condition as before its entry into the separator. If the level of the liquid in the separator 2 rises, as indicated by the sight glass 8, the valve 26 is opened to increase the flow of liquid through the meter 22 until the level remains constant. Conversely, if the level of the liquid in the separator 2 becomes lower, then the valve is opened sufficiently to stop the level from changing. As the liquid flows through the meter 22, the turbine rotor 40 turns at a rate corresponding to the rate of flow of liquid through the meter.

Figure 4:
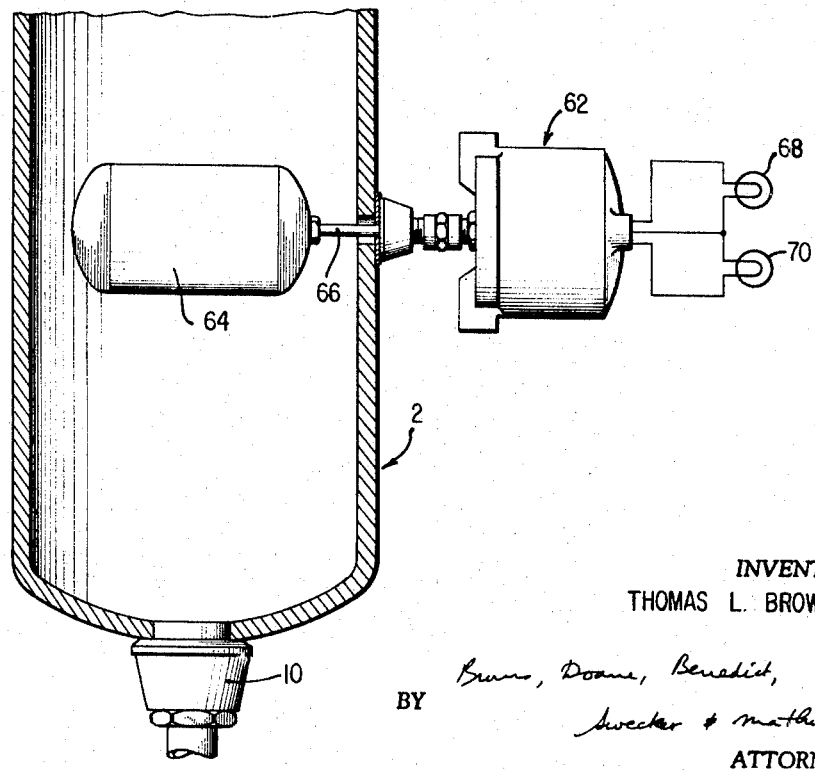
FIG. 4 is a cross sectional view of the steam separator showing a modified water level indicator.

A modified water level indicator 62 is illustrated in FIG. 4. The level indicator 62 includes a float 64 mounted on an arm 66, which swings in a plane parallel to the central axis of the separator 2. Inside the body of the level indicator 62, there is a single pole, double throw electrical switch. A light bulb 68 is in series circuit with one pole of the switch and another light bulb 70 is in series circuit with the other pole of the switch. The arm 66 controls the position of the movable switch contact member. The switch is arranged to close an electric circuit for lighting the bulb 68 when the switch contact member engages the first pole of the switch in response to a low level of liquid in the separator as sensed by the float 64. Conversely, when the liquid level rises, the float 64 swings the arm 66 in the opposite direction. As the switch contact member is disengaged from the first pole of the switch, the bulb 68 is extinguished and when the second pole is engaged, the other bulb 70 is lighted. When the contact member is in its intermediate position, both circuits are open and neither light bulb 68 or 70 is lighted. Thus, the light bulbs 68 and 70 indicate a low and high level, respectively, of liquid in the separator 2. The operator adjusts the valve 26 while observing the light bulbs 68 and 70. Flow through the meter 22 is adjusted until the float 64 is at the null position, and both lights 68 and 70 are extinguished.

The flow rate measured by the instrument 60 is a measure of the saturated liquid in the steam. It is necessary also to measure the feedwater flow rate to the steam generating unit. A flow meter such as is shown in FIG. 3 may be used for measuring the feedwater flow rate. The rate of flow of liquid through the meter 22 is subtracted from the rate of flow of feedwater to the steam generating unit and the difference is divided by the feedwater flow rate to determine the percentage of liquid in the steam. Steam quality is the percentage of vapor in the steam flowing from the steam generating unit and therefore is the difference between 100% and the percent moisture.

An important advantage of the method and apparatus of this invention is that all of the steam from the steam generating unit flows continuously through the measuring apparatus of this invention. After the liquid content is measured, the liquid is recombined with the steam, so that it is substantially in the same state as before entering the quality measuring apparatus. This is particularly important where the steam is wet, such as 80% quality steam. Since none of the steam is removed from the system for the purpose of measuring quality, the method and apparatus of this invention is more efficient than conventional calorimetry methods. A further advantage of the apparatus of this invention is that the steam can be used for flushing out the system and removing rust and scale particles that otherwise may clog the flow meter.

While this invention has been illustrated and described in one embodiment, it is recognized that variations and changes may be made therein without departing from the invention as set forth in the claims.

I claim:

1. A method of measuring the quality of steam from a steam generating unit comprising measuring the feedwater flow rate to the steam generating unit, separating the steam produced by the generating unit into its liquid and vapor components, measuring the rate of flow of the separated liquid, and recombining the liquid and vapor components, whereby the steam quality may be calculated from the feedwater rate and the separate liquid flow rate.

2. A method of measuring the quality of steam from a generating unit comprising measuring the feedwater flow rate to the steam generating unit, separating in a separator the steam produced by the generating unit into its liquid and vapor components, adjusting the rate of flow of the separated liquid from the separator to maintain a constant liquid level in the separator, measuring the rate of flow of the separated liquid, and recombining the liquid and vapor components, whereby the steam quality may be calculated from the feedwater flow rate and the separated liquid flow rate.

3. A method of measuring the quality of steam from a steam generating unit comprising measuring the feedwater flow rate to the steam generating unit, separating in a separator the steam produced by the generating unit into its liquid and vapor components, withdrawing the separated vapor from the separator, withdrawing the separated liquid from the separator, said liquid and vapor being withdrawn through separate outlets, adjusting the rate of flow from the separator of the separated liquid to maintain a constant liquid level in the separator, measuring the rate of flow of the separated liquid, and recombining the liquid and vapor components, whereby the steam quality may be calculated from the water supply rate and the separated liquid flow rate.

4. A method of determining the quality of steam from a steam generating unit comprising measuring the rate of flow of water supplied to the steam generating unit, conducting substantially the entire steam output of said generating unit to a separator, separating in the separator the liquid and vapor components of the steam produced by the generating unit, measuring the rate of flow of the separated liquid, and recombining the liquid and vapor components, whereby the steam quality may be calculated from the water supply rate and the separated liquid flow rate.

5. Apparatus for measuring the quality of steam generated by a steam generating unit comprising means for separating the steam into its liquid and vapor components, means for collecting the liquid component, means for conducting the vapor component out of said separating means, conduit means communicating between said separating means and said vapor conducting means, said conduit means being in position for receiving said liquid component from said collecting means, means for adjusting the rate of flow of liquid in said conduit means, and means for measuring the rate of flow of liquid in said conduit means, whereby the quality of the steam may be determined without removing steam from the system.

6. Apparatus for measuring the quality of steam generated by a steam generating unit comprising a separator for separating steam into its liquid and vapor components and collecting the liquid component therein, means for indicating the liquid level in said separator, said separator having a vapor outlet and a liquid outlet, means for connecting together said vapor and liquid outlets downstream from said separator, means for adjusting the rate of flow of liquid in said liquid outlet, and means for measuring the rate of flow of liquid in said liquid outlet, whereby the adjusting means and the indicating means are operated to maintain a constant level in the separator.

7. Apparatus for measuring the quality of steam generated by a steam generating unit comprising a separator for separating steam into its liquid and vapor components and collecting the liquid component therein, means for indicating the liquid level in said separator, said separator having a vapor outlet and liquid outlet, means for connecting together said vapor and liquid outlets downstream from said separator, means for selectively reversing the direction of flow of liquid in said liquid outlet, means for adjusting the rate of flow of liquid in said liquid outlet, and means for measuring the rate of flow of liquid in said liquid outlet, whereby rust and scale may be flushed from the system.

8. Apparatus for measuring the quality of steam generated by a steam generating unit comprising a hollow separator, a float in the separator, said separator having a vapor outlet and a liquid outlet, said vapor outlet being above the float and said liquid outlet being below the float, means for indicating the position of said float with respect to a reference level, valve means in said liquid outlet for controlling the flow of liquid therein, means for measuring the rate of flow of liquid in said liquid outlet, and means for connecting together said liquid outlet and said vapor outlet downstream of said flow measuring means, whereby the liquid level may be adjusted until the position of the float remains constant.

9. Apparatus for measuring the quality of steam generated by a steam generating unit comprising a hollow separator, a float in the separator, said separator having a vapor outlet and a liquid outlet, said vapor outlet being above the float and said liquid outlet being below the float, means for indicating the position of said float with respect to a reference level, valve means in said liquid outlet for controlling the flow of liquid therein, means for measuring the rate of flow of liquid in said liquid outlet, a header and means for connecting said liquid outlet and said vapor outlet to said header downstream of said flow measuring means, said connecting means including a vapor nozzle in position for drawing liquid from said liquid outlet into said header, whereby the liquid level may be adjusted until the position of the float remains constant.

10. In a steam generating unit system, quality measuring apparatus comprising means for measuring feedwater flow rate to the steam generating unit, means for separating steam into its liquid and vapor components, means for collecting the liquid component, means for conducting the vapor component out of said separating means, conduit means communicating between said separating means and said vapor conducting means, said conduit means being in position for receiving said liquid component from said collecting means, means for adjusting the rate of flow of liquid in said conduit means, and means for measuring the rate of flow of liquid in said conduit means, whereby the quality of the steam may be determined without removing steam from the system.

References Cited

UNITED STATES PATENTS 3,265,301   8/1966   Amdur et al. _____ 73—29 X

RICHARD C. QUEISSER, *Primary Examiner.*

C. IRVIN McCLELLAND, *Assistant Examiner.*